(12) United States Patent
Chopra et al.

(10) Patent No.: US 7,658,433 B2
(45) Date of Patent: Feb. 9, 2010

(54) LOCATING STRUCTURE FOR AN INSTRUMENT PANEL ASSEMBLY OF A MOTOR VEHICLE

(75) Inventors: Vikram Chopra, Canton, MI (US); Chae Han An, Northville, MI (US); Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 83 days.

(21) Appl. No.: 11/971,644

(22) Filed: Jan. 9, 2008

(65) Prior Publication Data

US 2009/0174221 A1 Jul. 9, 2009

(51) Int. Cl.
*B62D 25/14* (2006.01)
(52) U.S. Cl. .......................................... 296/70; 180/90
(58) Field of Classification Search .................. 296/70, 296/72, 74; 180/90
See application file for complete search history.

(56) References Cited

U.S. PATENT DOCUMENTS

| 5,711,567 | A | 1/1998 | Sinner et al. |
|---|---|---|---|
| 5,927,747 | A * | 7/1999 | Farrington ............... 280/728.3 |
| 6,132,154 | A | 10/2000 | Easter et al. |
| 6,520,566 | B2 | 2/2003 | Kim et al. |
| 6,604,780 | B2 | 8/2003 | Lee et al. |
| 6,634,693 | B2 | 10/2003 | Straesser, Jr. et al. |
| 6,666,413 | B2 | 12/2003 | Nakajima et al. |
| 6,866,321 | B2 | 3/2005 | Yang et al. |

* cited by examiner

*Primary Examiner*—Lori L Lyjak
(74) *Attorney, Agent, or Firm*—Gifford, Krass, Sprinkle, Anderson & Citkowski, P.C.

(57) ABSTRACT

An instrument panel assembly for a motor vehicle includes a first component, a second component and a frame. The first component has a first aperture. The second component has a second aperture. The frame has a main wall. The frame includes a generally cylindrical boss extending outwardly from the main wall. The boss has an outer surface. The boss has a bore aligned with the first aperture of the first component to receive a fastener therethrough to secure the first component to the frame. The boss extends through the second aperture of the second component such that the outer surface locates the second component relative to the frame along a plane generally orthogonal to a longitudinal axis of the boss. The second component is disposed between the first component and the frame so as to be constrained along the longitudinal axis of the boss.

12 Claims, 3 Drawing Sheets

LOCATING STRUCTURE FOR AN INSTRUMENT PANEL ASSEMBLY OF A MOTOR VEHICLE

FIELD OF THE INVENTION

The invention relates to an instrument panel assembly for a motor vehicle. More particularly, the invention relates to a locating structure for locating and interconnecting the components that form the instrument panel assembly.

BACKGROUND OF THE INVENTION

An instrument panel assembly for a motor vehicle includes a variety of components, such as bezels, speedometer clusters, electronics, controls, ventilation ducts and the like. Typically, each component of the instrument panel assembly is coupled to a main support frame and/or to adjacent components. It remains desirable to provide an improved locating structure that can be used to locate and secure the components of the instrument panel assembly to the support frame and/or to adjacent components.

SUMMARY OF THE INVENTION

According to one aspect of the invention, an instrument panel assembly is provided for a motor vehicle. The instrument panel assembly includes a first component having a first aperture; a second component having a second aperture; and a frame having a main wall. The frame includes a generally cylindrical boss extending outwardly from the main wall. The boss has an outer surface. The boss has a bore aligned with the first aperture of the first component to receive a fastener therethrough to secure the first component to the frame. The boss extends through the second aperture of the second component such that the outer surface locates the second component relative to the frame along a plane generally orthogonal to a longitudinal axis of the boss. The second component is disposed between the first component and the frame so as to be constrained along the longitudinal axis of the boss.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
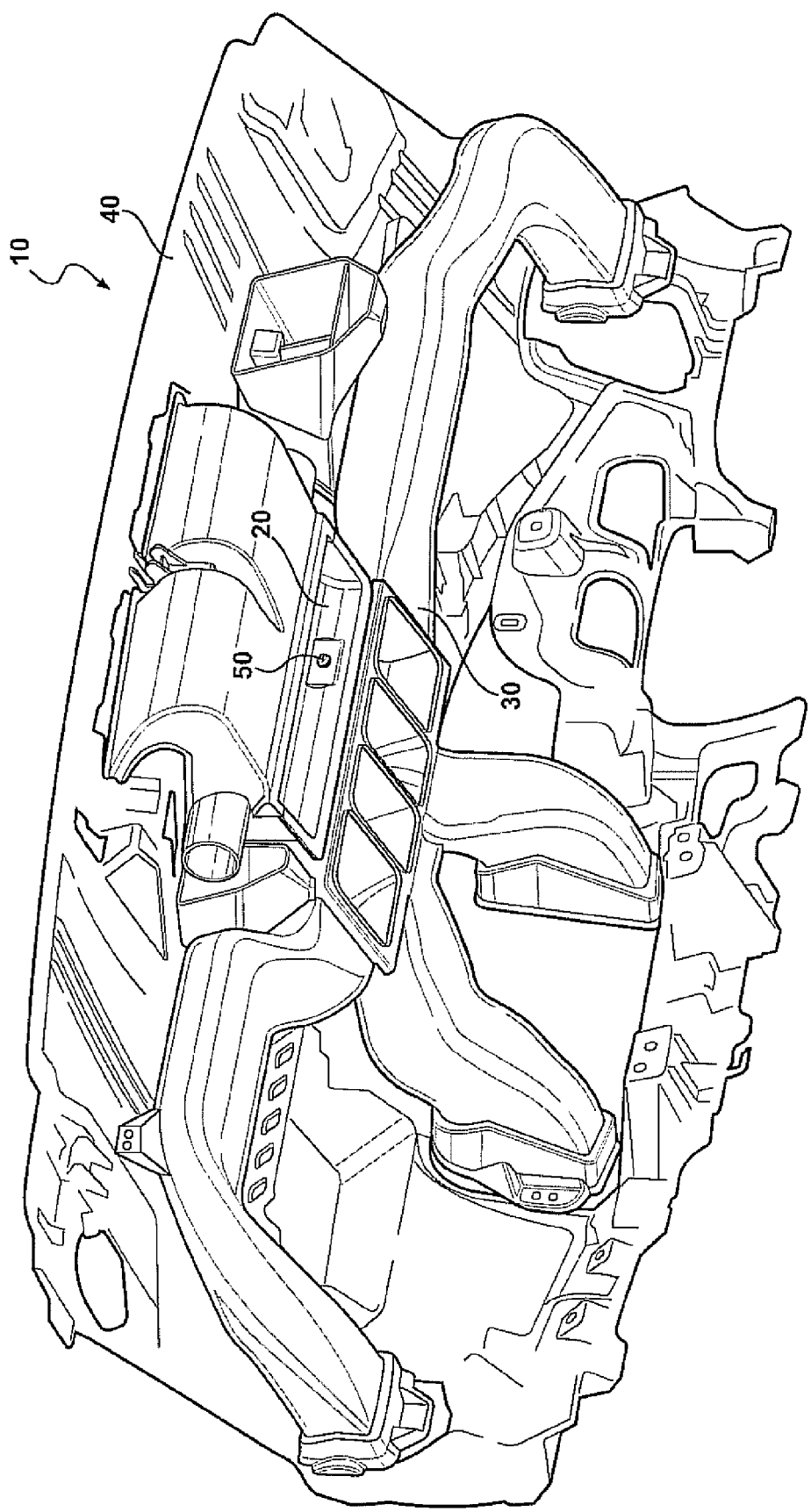
FIG. 1 is a bottom perspective view of an instrument panel assembly according to one embodiment of the invention.
Figure 2:
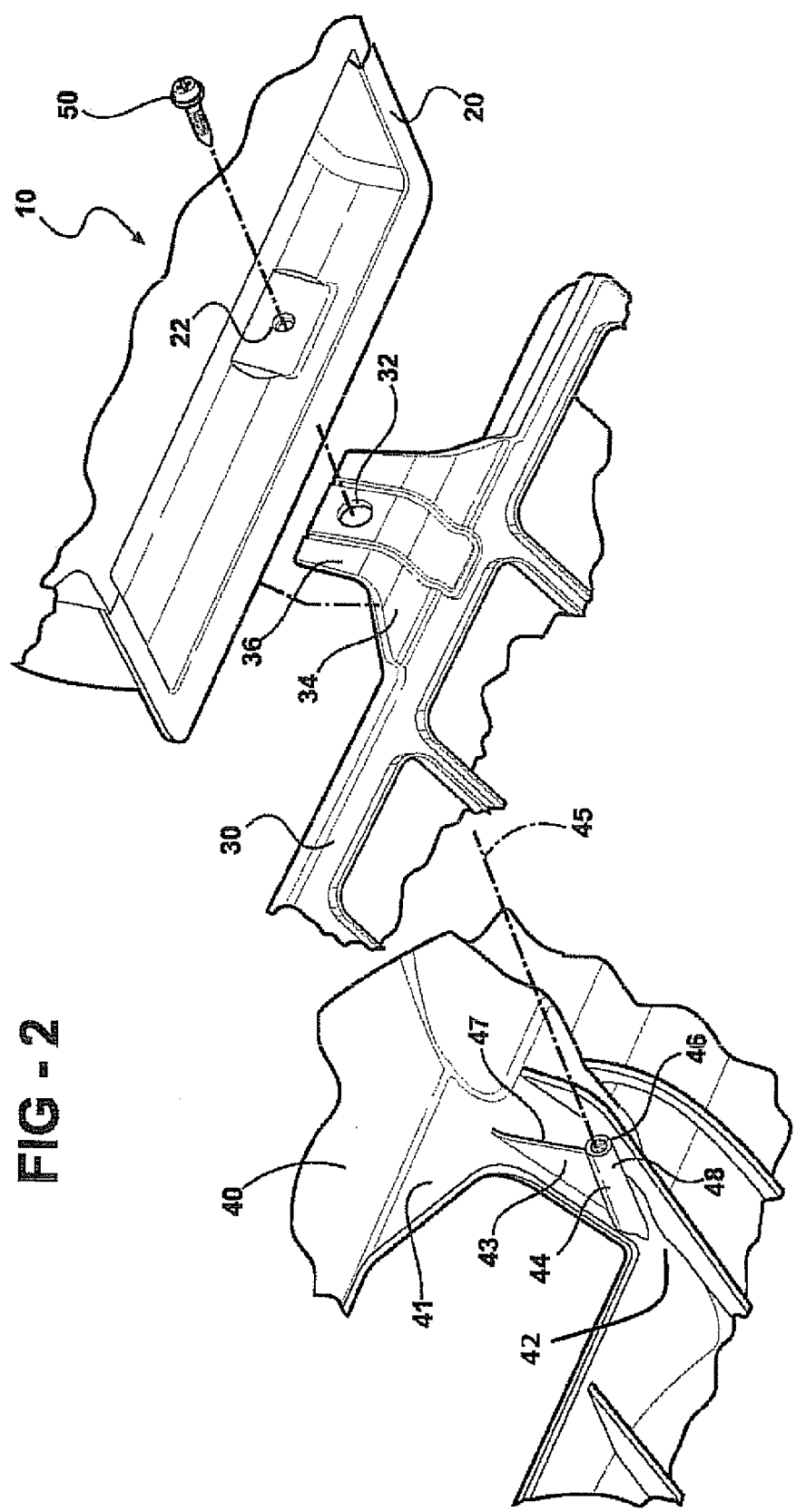
FIG. 2 is an exploded top perspective view of a portion of the instrument panel assembly.
Figure 3:
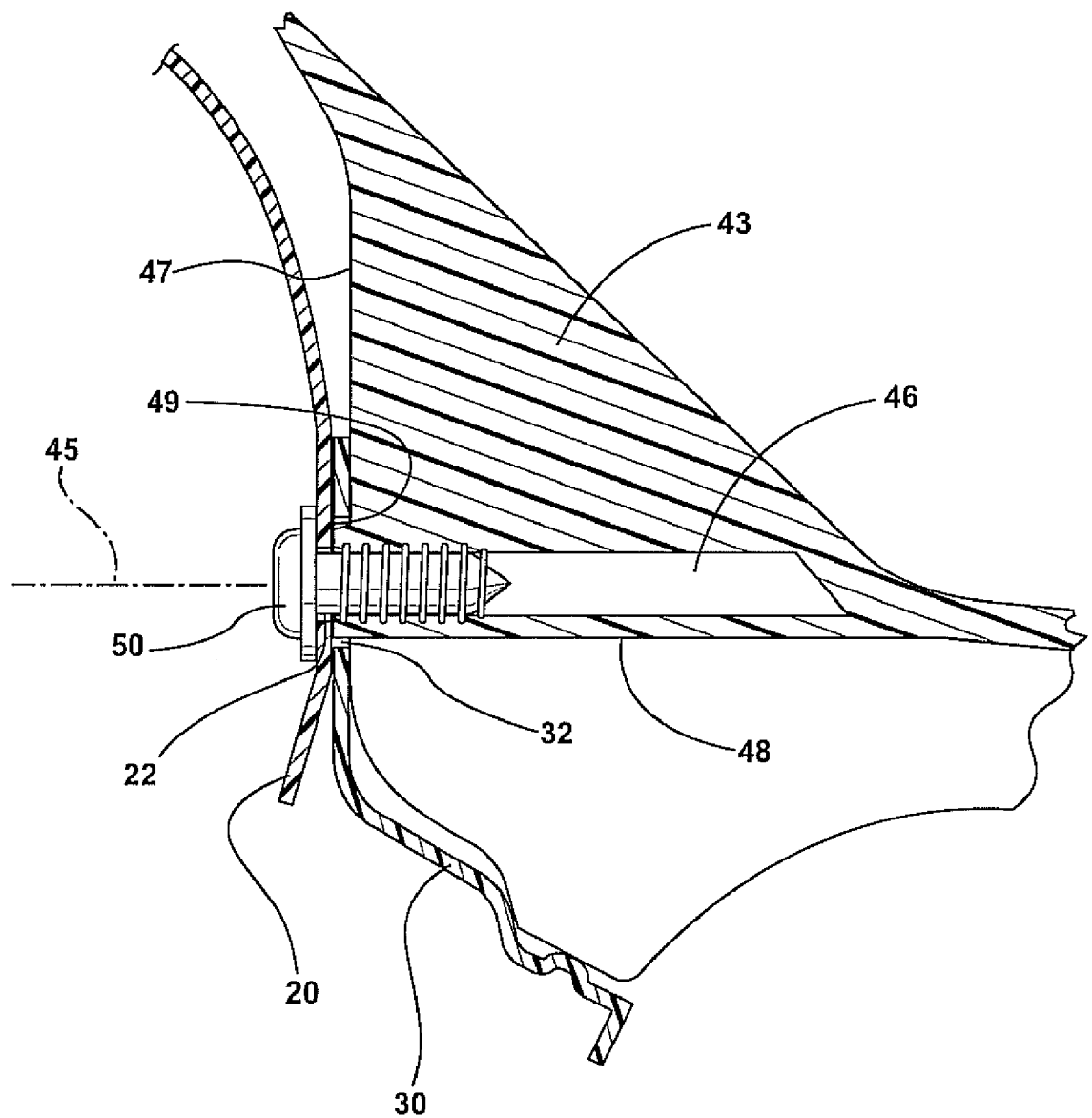
FIG. 3 is a cross sectional view of the instrument panel assembly.

Referring to the figures, an instrument panel assembly for a motor vehicle is generally indicated at 10. The instrument panel assembly 10 includes a first component 20 having a first aperture 22. The instrument panel assembly 10 includes a second component 30 having a second aperture 32. The instrument panel assembly 10 further includes a frame 40 having a main wall 42 that extends generally transversely in the motor vehicle. Described in greater detail below, the invention provides a locating structure for locating and interconnecting the first component 20, second component 30 and frame 40 of the instrument panel assembly 10

The frame 40 includes a boss 44 extending outwardly from the main wall 42. The boss 44 has a generally cylindrical outer surface 48. The boss 44 has a bore 46 aligned with the first aperture 22 of the first component 20. A fastener 50 is inserted through the first aperture 22 of the first component 20 and the bore 46 of the boss 44 to fixedly secure the first component 20 to the frame 40. An end surface 49 of the boss 44 contacts the first component 20 and locates the first component 20 relative to the frame 40

The boss 44 extends through the second aperture 32 of the second component 30 such that the outer surface 48 locates the second component 30 relative to the frame 40 along a plane generally orthogonal to a longitudinal axis 45 of the boss 44. A reinforcing wall 43 extends between outer surface 48 of the boss 44 and a main wall 42 of the frame 40. The reinforcing wall 43 includes a leading surface 47 facing the second component 30. The second component 30 is disposed between the first component 20 and the leading surface 47 on the frame 40 so as to be constrained along the longitudinal axis 45 of the boss 44. The second component has a tab portion 34 with an end portion 36.

In the illustrated embodiment, the first 20 and second 30 components are ducts of a ventilation system in the motor vehicle. In this embodiment, the boss 40 extends outwardly from a back surface 41 of the frame 40 to support the ducts 20, 30 behind the instrument panel assembly 10.

It should be appreciated that the invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. An instrument panel assembly for a motor vehicle, said instrument panel assembly comprising:

a first component having a first aperture;

a second component having a second aperture; and a frame having a main wall extending transversely in the vehicle and a generally cylindrical boss extending outwardly from the main wall, the boss having an outer surface, the boss having a bore aligned with the first aperture of the first component to receive a fastener therethrough to secure the first component to the frame, the boss extending through the second aperture of the second component such that the outer surface locates the second component relative to the frame along a plane generally orthogonal to a longitudinal axis of the boss, the second component being disposed between the first component and the frame so as to be constrained along the longitudinal axis of the boss.

2. The instrument panel assembly as set forth in claim 1, wherein the boss includes an end surface that contacts and locates the first component relative to the frame along a longitudinal axis of the boss.

3. The instrument panel assembly as set forth in claim 1, wherein the frame includes a reinforcing wall extending between the outer surface of the boss and the main wall of the frame.

4. The instrument panel assembly as set forth in claim 3, wherein the reinforcing wall includes a leading surface that contacts the second component to locate the second component relative to the frame along a longitudinal axis of the boss.

5. The instrument panel assembly as set forth in claim 4, wherein a portion of the outer surface of the boss extends axially outwardly relative to the leading surface to locate the second component relative to the frame along a plane generally orthogonal to the longitudinal axis of the boss.

6. The instrument panel assembly as set forth in claim 1, wherein the boss extends rearwardly from a back surface of the frame.

7. The instrument panel assembly as set forth in claim 6, wherein the first component and the second component are components of a ventilation system in the motor vehicle.

8. The instrument panel assembly as set forth in claim 7, wherein the fastener is a threaded screw that extends through the first and second apertures and threadingly engages the bore in the boss to fixedly secured the first and second component to the frame.

9. An instrument panel assembly for a motor vehicle, said instrument panel assembly comprising:
   a first component having a first aperture;
   a second component having a second aperture; and
   a frame having extending transversely in the vehicle and a generally cylindrical boss extending outwardly from the frame, the boss having a bore aligned with the first aperture of the first component to receive a fastener therethrough to secure the first component to the frame, the boss having an outer surface that extends axially from a leading surface of the frame that extends through the second aperture of the second component to locate the second component relative to the frame along a plane generally orthogonal to a longitudinal axis of the boss, the second component being disposed between the first component and the leading surface to constrain the second component relative to the frame along the longitudinal axis of the boss.

10. The instrument panel assembly as set forth in claim 9, wherein the boss includes an end surface that contacts and locates the first component relative to the frame along a longitudinal axis of the boss.

11. The instrument panel assembly as set forth in claim 9, wherein the frame includes a reinforcing wall extending between the outer surface of the boss and the main wall of the frame.

12. The instrument panel assembly as set forth in claim 11, wherein the leading surface extends between the outer surface of the boss and the frame.

\* \* \* \* \*